United States Patent [19]
Koch

[11] Patent Number: 6,137,436
[45] Date of Patent: *Oct. 24, 2000

[54] ALARM SENSOR, IN PARTICULAR FOR A TARGET TRACKING APPARATUS

[75] Inventor: Volker Koch, Ruckersdorf, Germany

[73] Assignee: Diehl Stiftung & Co., Nurnberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/088,600

[22] Filed: Jun. 1, 1998

[30] Foreign Application Priority Data

Jun. 12, 1997 [DE] Germany .......................... 197 24 773

[51] Int. Cl.⁷ .............................. G01S 13/00; G01S 13/88
[52] U.S. Cl. ................................ 342/73; 342/13; 342/61; 342/70; 342/89; 342/94; 342/95; 342/147; 342/175; 342/189; 342/195; 375/200
[58] Field of Search ..................................... 375/200, 206, 375/208, 209, 210; 342/61, 62, 63, 64, 65, 66, 67, 68, 69, 70, 73, 89, 94, 95, 96, 97, 98, 99, 175, 195, 27, 28, 59, 78, 80, 103, 189, 13, 20, 74, 118, 147

[56] References Cited

U.S. PATENT DOCUMENTS

| | | | |
|---|---|---|---|
| 2,776,424 | 1/1957 | Lair et al. ................................... | 342/59 |
| 2,999,235 | 9/1961 | Von Segebaden et al. ............... | 342/78 |
| 3,168,732 | 2/1965 | Bretscher ................................... | 342/97 |
| 3,878,527 | 4/1975 | Rensin et al. ............................. | 342/103 |
| 4,115,772 | 9/1978 | Valdes ....................................... | 342/189 |
| 4,216,472 | 8/1980 | Albanese ................................... | 342/95 |
| 4,220,952 | 9/1980 | Whiteley et al. . | |
| 4,531,125 | 7/1985 | Beyer et al. .............................. | 342/96 |
| 4,896,160 | 1/1990 | Miller, Jr. . | |
| 5,361,069 | 11/1994 | Klimek, Jr. et al. . | |
| 5,424,744 | 6/1995 | Westphal ................................... | 342/27 |

FOREIGN PATENT DOCUMENTS

| | | |
|---|---|---|
| 0 223 949 A1 | 6/1987 | European Pat. Off. . |
| 0 714 035 A1 | 5/1996 | European Pat. Off. . |
| 3837483 A1 | 5/1990 | Germany . |
| 3608108 C1 | 6/1990 | Germany . |
| 3515496 A1 | 3/1992 | Germany . |
| 4430830 A1 | 3/1996 | Germany . |

OTHER PUBLICATIONS

Robert c. Dixon, "Spread Spectrum Systems with Commercial Applications",John Wiley & Sons, Inc. 1994, Title Page Only.

Primary Examiner—Bernarr E. Gregory
Attorney, Agent, or Firm—Scully, Scott, Murphy & Presser

[57] ABSTRACT

A pseudo-noise-modulated spread spectrum is irradiated undirectedly—or, encoded by different modulation, into mutually displaced spatial sectors—and the energy (20) received after reflection at a potential target (13) is cross-correlated, using the pseudo-noise code which is predetermined at the transmission end, in order to provide a spherical monitoring effect which is continuous but which cannot be located in respect of its origin, to provide a warning in particular for marine craft, land vehicles and aircraft against an attacking guided missile as the target (13) to be repelled, and in order to be able to transfer to a target tracker (12) distance and speed information obtained from the correlation product, with the alarm signal, if the alarm sensor (11) is not itself also used as the tracking sensor.

2 Claims, 1 Drawing Sheet

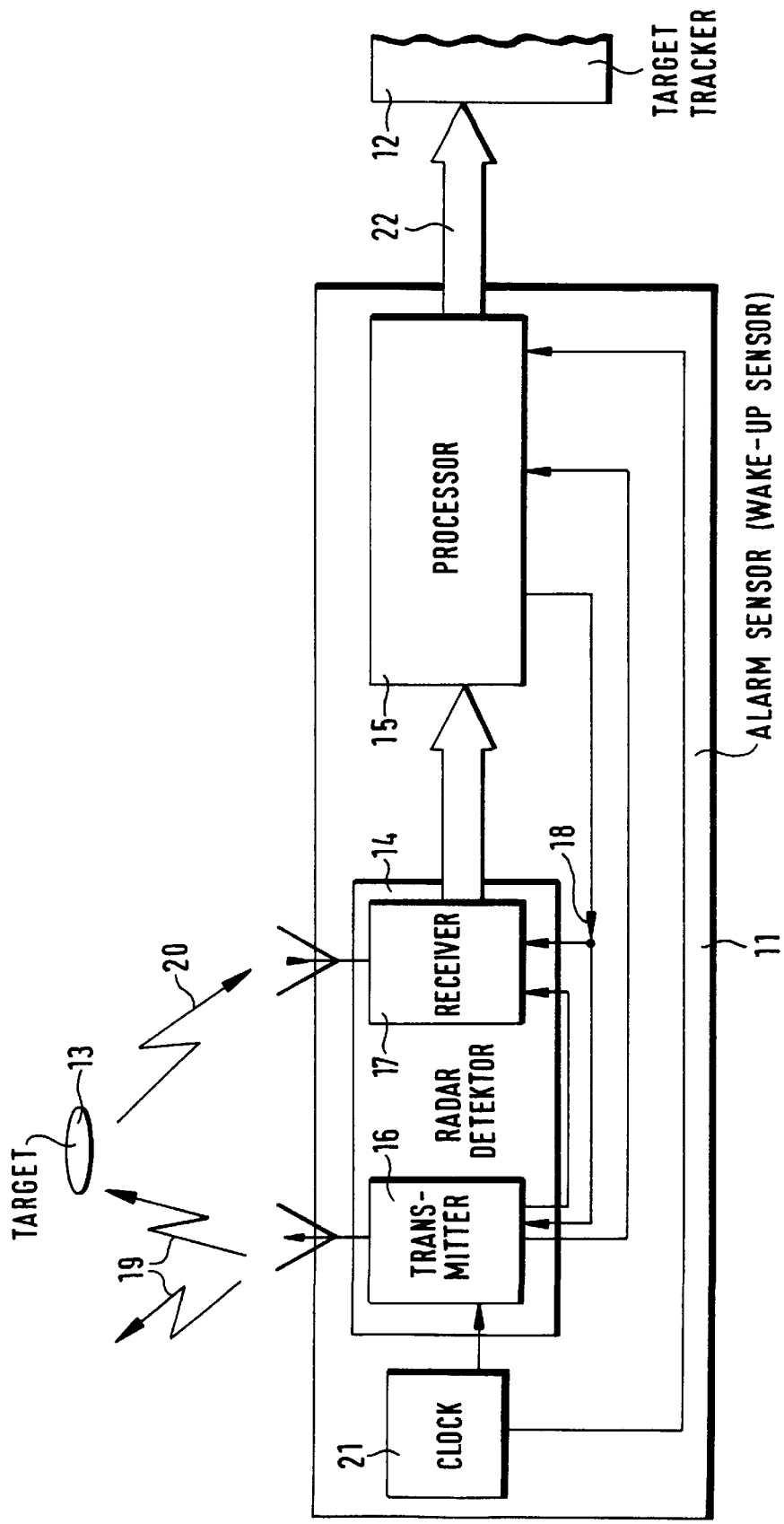

ALARM SENSOR, IN PARTICULAR FOR A TARGET TRACKING APPARATUS

BACKGROUND OF THE INVENTION

1. Field of the Invention

The alarm concerns an alarm sensor with a radar detector for activating a target tracking tracker upon the approach of a target which is to be potentially combatted; in particular, a missile which is approaching a land vehicle or marine craft and which is to be defended against.

2. Discussion of the Prior Art

Alarm or wake-up sensors of that kind are known for example from DE 35 15 496 A1 or DE 38 37 483 A1 for activating and directing stationary defence means (in mine form) against flying target objects approaching at relatively low height such as in particular battle helicopters, with passive or active alarm sensor detectors responding to their (sound) radiation or (rotor) modulation.

The present invention however concerns in particular a wake-up or alarm sensor for switching a target tracking apparatus, a so-called tracker, onto an attacking missile which is to be repelled. The target tracking apparatus may be in accordance with DE 36 08 108 C1 a navigational computer for detecting and extrapolating the current trajectory of the missile to be repelled; or in accordance with DE 44 30 830 A1 or DE 44 26 014 A1 it may be a reflection location tracker which with its spatial orientation follows the relative position of the missile after the approach flight thereof has once been detected.

As a missile to be repelled does not have the pronounced signature of a battle helicopter to be defended against and approaches the endangered object at a substantially faster speed, an alarm sensor which operates with passive detectors cannot be readily used with a high prospect of success in missile defence situations. An active alarm sensor which is therefore based on a reflection location function on the other hand suffers from the disadvantage of a high probability of betraying itself, which exposes it to attack by anti-radar missiles which are optimised in relation thereto.

The danger of self-betrayal however is avoided in the case of a passive bistatic radar system, as is described in U.S. Pat. No. 5 424 744: in that case the alarm procedure is initiated by virtue of the fact that the instantaneous reception connection from a potentially threatened object such as in particular an aircraft to a constantly transmitting satellite, in particular a navigational satellite which is low above the horizon, is at least temporarily significantly disturbed because a missile approaching the object crosses that radio communication direction and thereby causes reflection or shadowing phenomena. Although the object to be protected, for position determining purposes, continuously receives at least four satellites in different positions, among those there are however always also some which at a given moment are not in the desirable position of being near to the horizon or whose relative position in relation to the endangered object, as regards a significant disturbance in the radio communication, is disadvantageous in regard to the direction of approach of the attacking missile, in consideration of the large distance to the object. That results in particular in observation gaps and thus situations involving a threat from changing directions which are not predictable, if an attacking missile is to be detected at the greatest possible distance from the object to be protected, in order to be able to make the defences ready for operation in good time.

SUMMARY OF THE INVENTION

In consideration of those factors, the object of the present invention is to provide an alarm or wake-up sensor which as far as possible covers the entire hemisphere around the object to be protected but which as far as possible is also self-betrayal-free, in particular for switching a tracker onto an attacking missile.

Another object of the invention resides in the provision of a method in that through the intermediary of sectorially different or distinguished radiated pseudo-noise encoded transmitted energy on board of particularly an armored band vehicle, there can be determined, in the absence of any danger from self-betrayal, as to whether and from which direction there is expected or carried out an attack by an airborne body.

In accordance with the invention that object is attained by a transmitter of the radar detector radiating a narrow-band carrier which is expanded over a large frequency range and which is modulated with a pseudo-noise code, as transmission energy whose reception energy which is reflected at the potential target is converted into a narrow frequency range again by way of a receiver for the radar detector, said receiver being synchronized with the transmitter, and is cross-correlated with the transmission energy, using the pseudo-noise code which is predetermined at the transmission end, in order to supply the switch-on signal for the tracker.

In accordance with the construction provided as the alarm sensor is an active (radar) detector disposed near the object to be protected which can be stationary or a water craft, land vehicle or aircraft, or disposed directly at said object, which detector radiates noise-coded transmission energy in continuous-wave operation with spectrally spread, that is to say reduced-energy carrier (a so-called spread spectrum) into the surrounding half-space or—with different pseudo-noise encoding—into mutually pivoted spatial sectors. The reflections of that transmission energy at an approaching missile are received in the alarm sensor by a receiver synchronised with the transmitter and are evaluated in respect of distance and speed of approach (Doppler effect). It is also possible for a plurality of such alarm sensors, for example mounted on different objects to be protected, to be operated in spatial proximity it their transmission energies are decoupled from each other by way of individual pseudo-noise codes, therefore the reflections can be evaluated separately.

By virtue of its reduced-energy noise signal such a transmitter cannot be traced in practice, especially as its spread spectrum corresponds to that which is present practically everywhere as radiation from navigational satellites.

The CW-pseudo-noise signal can therefore be irradiated hemispherically, in order to obtain in general alarm information from the reflections; or it is radiated in time-displaced relationship—or in time-overlapping but directionally encoded relationship—into mutually adjacent spatial sectors in order thereby to scan out the hemisphere and thus at the same time to obtain with the alarm information also directional information about the instantaneous position of the detected potential attacker as the target to be repelled. The latter requires the directional guidance for switching the tracker sensing system onto the target. However the alarm sensor itself can also serve as the tracking sensor for the target once detected.

BRIEF DESCRIPTION OF THE DRAWING

Additional alternatives and further advantages of the invention will be apparent from the further claims and from the following description of a preferred embodiment of the present invention which is shown in the form of a block circuit diagram in abstracted form in the drawing, being restricted to what is essential.

The single FIGURE in the drawing shows the production of an alarm signal by means of a non-traceable continuous-wave radar radiation in accordance with the present invention.

DETAILED DESCRIPTION OF A PREFERRED EMBODIMENT

The alarm sensor 11 for activating a target tracker 12 upon the approach of a target 13 to be repelled, in particular in the form of a target-seeking missile, is provided with an active radar detector 14. A processor 15 controls the transmitter 16 thereof for irradiation of a pseudo-noise-modulated carrier which is narrow-banded in itself but which is spread over a wide frequency range to reduce the spectral energy (and thus the probability of betrayal). In regard to the transmission and reception technology with a spread spectrum, reference is directed to the standard work "SPREAD SPECTRUM SYSTEMS with commercial applications" by R. C. Dixon published by John Wiley & Sons, Inc. For the functioning of the present alarm sensor, irradiation is effected undirectedly into the half-space or in encoded fashion into given and in particular successive spatial sectors; encoding lies in the succession in respect of time of the individual radiation directions or (more specifically, with simultaneous or overlapping irradiation) preferably in pseudo-noise codes which are also determined by the processor 15 and which significantly differ from one sector to another. The processor 15 supplies to the receiver 17 the corresponding control signals 18, with the items of information about the spectral spread and about the current pseudo-noise code. Thus in the alarm sensor 11, the proportion of transmission energy 19 which is reflected at the target 13 as the reception energy 20 is restored again to the narrow frequency range which is more productive in energy terms, by reversing the spread, with at the same time a reduction in the energy of a narrow-band interference signal which is possibly contained in the reception energy 20. In addition, a cross-correlation is formed in the processor 15 between the transmission energy 19 and the reception energy 20 with the currently predetermined pseudo-random code. In that situation a clock 21 synchronises encoding of the irradiated transmission energy 19 and processing of the reception energy 20 containing the same code, for correlation evaluation in the processor 15, while the receiver 17 is directly synchronised by the transmitter 16 in the manner known from radar technology.

If the correlation analysis in the processor 15 exceeds a predetermined limit value, using the pseudo-noise code which is predetermined at the transmission end, and if therefore the reception energy 20 contains transmission energy 19 reflected at the target, with a sufficient degree of reliability, then the alarm sensor 11 supplies an alarm signal 22 to the tracker 12. This contains on the one hand the switch-on command and on the other hand—more specifically by way of the correlation with the known pseudo-noise code—distance information and Doppler (that is to say speed) information for switching the target tracking sensor system of the tracker 12 onto the movement of the target 13.

In accordance with the invention therefore a pseudo-noise-modulated spread spectrum is irradiated in undirected manner—or, encoded by different modulation, into mutually displaced spatial sectors—and the energy 20 received after reflection at a potential target 13 is cross-correlated, using the pseudo-noise code which is predetermined at the transmission end, in order to achieve a spherical monitoring effect which is continuous but which cannot be located in regard to its origin, for providing a warning in particular in respect of marine vessels, land vehicles and aircraft against an attacking guided missile as the target 13 to be repelled, and in order to be able to transmit to a target tracker 12 distance and speed information obtained from the correlation product, with the alarm signal, if that alarm sensor is not itself also used as a tracking sensor.

What is claimed is:

1. A method of initiation a wake-up sensor with a radar detector while preventing self-betrayal for activating a target tracker in response to the sending by said radar detector of the approach of an attacking missile to an armored land vehicle or marine craft, comprising radiating from a transmitter of the radar detector a reduced-energy carrier so as to be nondirectedly propagated in continuous-wave operation into surrounding space into mutually adjacent spatial sectors over a large frequency spectrum and effecting modulation thereof with sectorially different radiated pseudo-noise encoding, having a receiver of the radar detector convert transmission energy incorporating receiving energy which is reflected at the missile into a reduced frequency range, synchronizing said receiver with the transmitter, and implementing a cross-correlation with the transmission energy through the sectorially different pseudo-noise encoding which is predetermined at the transmitter so as to supply a wake-up signal to the tracker.

2. A method according to claim 1, wherein there is imparted an alarm signal to the target tracker which includes a switch-on command, distance information and Doppler information obtained from the cross-correlation with the pseudo-noise code which is predetermined a the transmitter.

* * * * *